(12) United States Patent
Elliott

(10) Patent No.: US 6,567,035 B1
(45) Date of Patent: May 20, 2003

(54) SYSTEMS AND METHODS FOR NETWORKING RADAR DETECTORS

(75) Inventor: Brig Barnum Elliott, Arlington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/998,435

(22) Filed: Nov. 30, 2001

(51) Int. Cl.[7] ............................................. G01S 7/42
(52) U.S. Cl. .......................... 342/20; 342/27; 342/28; 342/357.06; 342/357.08; 342/357.09; 342/357.1; 342/357.12; 342/357.13
(58) Field of Search ........................... 342/20, 27, 28, 342/357.06–357.13

(56) References Cited

U.S. PATENT DOCUMENTS

| | | | | |
|---|---|---|---|---|
| 6,118,403 A | * | 9/2000 | Lang | 342/20 |
| 6,204,798 B1 | * | 3/2001 | Fleming, III | 342/195 |
| 6,240,364 B1 | * | 5/2001 | Kerner et al. | 340/988 |
| 6,297,732 B2 | * | 10/2001 | Hsu et al. | 340/439 |
| 6,297,767 B1 | * | 10/2001 | Senoh | 342/357.06 |
| 6,384,776 B1 | * | 5/2002 | Martin | 342/20 |
| 6,429,812 B1 | * | 8/2002 | Hoffberg | 342/357.1 |
| 6,466,862 B1 | * | 10/2002 | DeKock et al. | 701/117 |

* cited by examiner

*Primary Examiner*—Thomas H. Tarcza
*Assistant Examiner*—Isam Alsomiri
(74) *Attorney, Agent, or Firm*—Leonard Charles Suchyta; James K. Weixel

(57) ABSTRACT

Systems and methods for networking detection devices associated with police activity are provided in a network that includes at least one server (180) and a number of client devices (130–150). Each of the client devices (130–150) transmits its location information to the server for storage. When a client device (130) receives detection information relating to radar activity, a police sighting or other police activity, that client device transmits the detection information to the server (180). The server (180) may then transmit the detection information to other client devices (140,150).

29 Claims, 8 Drawing Sheets

| DETECTION CLIENT 710 | CLIENT LOCATION 720 | DETECTION TYPE 730 | DETECTION LOCATION 740 | TIMESTAMP 750 |
|---|---|---|---|---|
| | | | | |
| | | | | |
| | | | | |
| | | | | |
| | | | | |

SYSTEMS AND METHODS FOR NETWORKING RADAR DETECTORS

BACKGROUND OF THE INVENTION

1. Field of the Invention

The present invention relates generally to radar detectors and, more particularly, to networking radar detectors and other detectors.

2. Description of Related Art

At present, radar detectors used in vehicles are stand-alone devices. That is, each radar detector must independently detect radar activity and alert the driver upon the detection. One drawback with such a scheme is that the radar detector must be within the range of a functioning radar before it can give an alert. Typically, the radar detector detects the radar only a short time before the radar device is able to determine the vehicle's speed. The short warning time often does not give the driver enough time to slow down before the vehicle's speed is detected.

Therefore, a need exists for systems and methods that provide increased warning of radar activity and/or other police activity.

SUMMARY OF THE INVENTION

Systems and methods consistent with the present invention address this and other needs by networking a number of detectors over a wireless network. The driver of one vehicle may then be alerted of speed traps based on detections made by detectors in other vehicles. This may enable the driver to slow down before entering a speed trap. Systems and methods consistent with the present invention also enable a driver or passenger in a vehicle to provide an input when a police vehicle is sighted. This information may also be transmitted to other vehicles over the wireless network.

In accordance with the principles of the invention as embodied and broadly described herein, a method that includes receiving location information associated with each of a plurality of client devices is provided. The method also includes storing the location information and receiving detection information from at least a first one of the plurality of client devices, where the detection information relates to at least one of radar activity and a police sighting. The method further includes storing the detection information and transmitting the detection information to at least a second one of the client devices.

In another implementation consistent with the present invention, a system that includes a memory and a processor coupled to the memory is provided. The processor is configured to receive location information associated with each of a plurality of client devices and store the location information in the memory. The processor is also configured to receive detection information from at least a first one of the plurality of client devices, where the detection information relates to at least one of radar activity and a police sighting. The processor is further configured to store the detection information in the memory and transmit the detection information to at least a second one of the client devices.

In a further implementation consistent with the present invention, a computer-readable medium having stored thereon a plurality of sequences of instructions is provided. The instructions, when executed by a processor, cause the processor to receive first detection information from a server via a network, where the first detection information relates to at least one of radar activity, light beam activity and a police sighting. The instructions also cause the processor to store the first detection information in a memory and display a map including a symbol representing at least one of radar activity, light beam activity and a police sighting.

In yet another implementation consistent with the present invention a system that includes a location detector, a radar detector and a processing device is provided. The location detector determines its geographical location. The radar detector detects radar waves and outputs a signal when the radar waves are detected. The processing device receives the signal and transmits a message indicating that the radar waves have been detected, along with geographical information associated with the detected radar waves, for use by others via a network

BRIEF DESCRIPTION OF THE DRAWINGS

The accompanying drawings, which are incorporated in and constitute a part of this specification, illustrate the invention and, together with the description, explain the invention. In the drawings.

FIG. 7 illustrates an exemplary database, consistent with an implementation of the present invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention enable radar detectors and other detectors to be networked. When one radar detector detects an operating radar, a client device associated with that radar detector transmits a signal via a network to a server. The server may then communicate the radar information to other vehicles. Systems and methods consistent with the present invention also enable police sighting information to be input and transmitted to the server. This police sighting information may also be transmitted to other vehicles.

Exemplary Network

Figure 1:
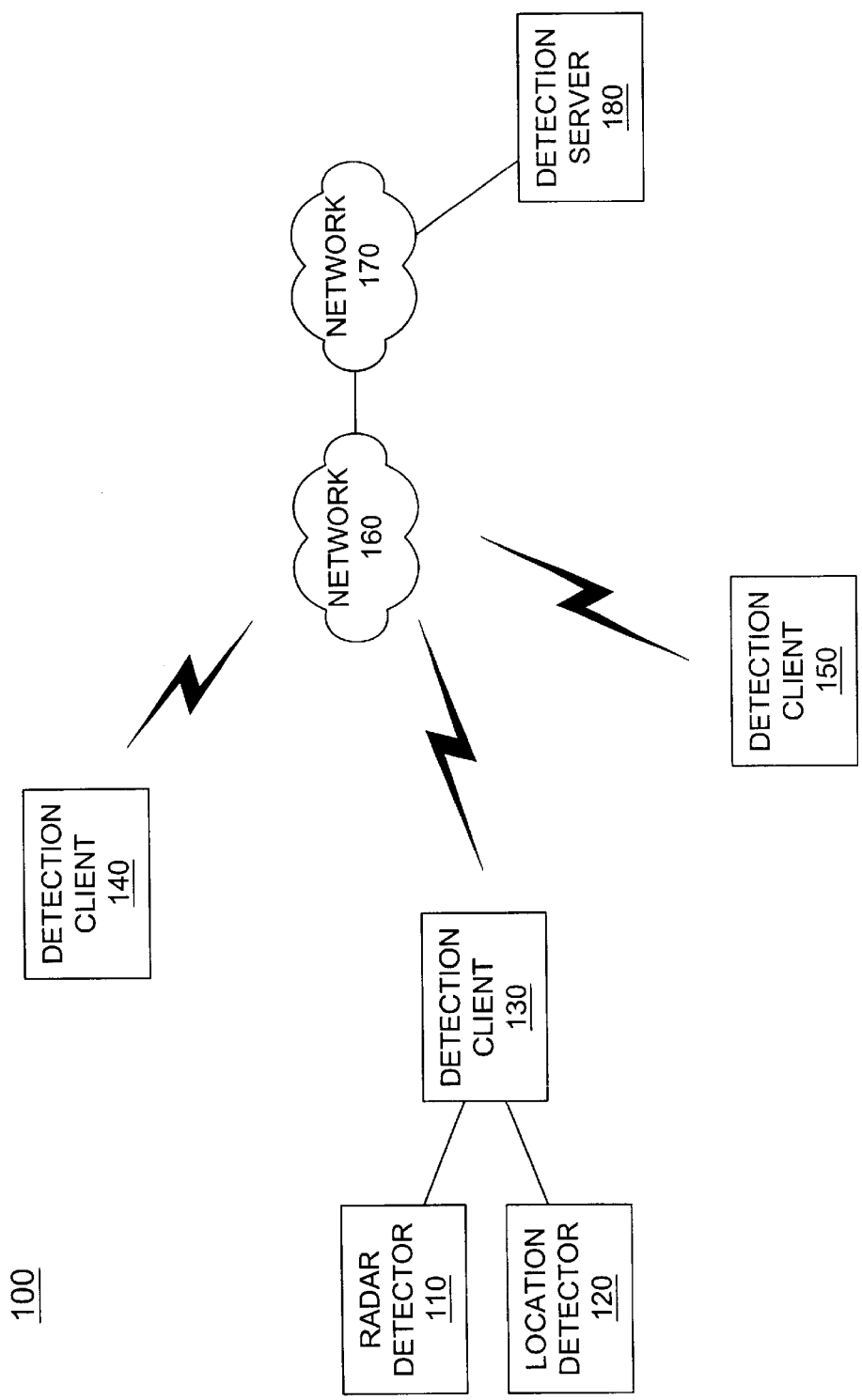
FIG. 1 is an exemplary diagram of a network in which systems and methods consistent with the present invention may be implemented.

FIG. 1 is a diagram of an exemplary network 100 in which systems and methods consistent with the present invention may be implemented. Network 100 includes radar detector 110, location detector 120 and detection client 130. These devices may all be located within a single vehicle. Network 100 also includes detection clients 140 and 150, networks 160 and 170 and detection server 180. Only three detection clients and one detection server are shown for simplicity. It should be understood that network 100 may include more or fewer detection clients and additional detection servers.

Radar detector 110 may function similarly to any conventional stand-alone radar detector. That is, whenever radar detector 110 detects radar activity above some user-selected level or a predetermined level, the radar detector 110 gives an audible beep and/or may flash one or more lights or light emitting diodes (LEDs) to alert the vehicle's driver. Radar detector 110 may also be connected (e.g., via a serial communications cable) to detection client 130. According to an exemplary implementation of the present invention, radar detector 110 sends a signal to detection client 130 whenever radar activity is detected.

Location detector 120 may be any conventional device, such as a global positioning satellite (GPS) transceiver device, that enables the location of a vehicle to be determined. The location detector 120 may be connected to detection client 130. Alternatively, the location detector 120 may be connected to a user display (not shown), which in turn may be connected to the detection client 130. In either case, the location detector 120 provides information relating to the vehicle's location to detection client 130.

In an alternative implementation, the location detector 120 may include a cellular telephone-like device whose location may be determined in a manner similar to a cellular telephone in an emergency 911 (E-911) service. In this implementation, no GPS equipment is required in the location detector 120.

Figure 2:
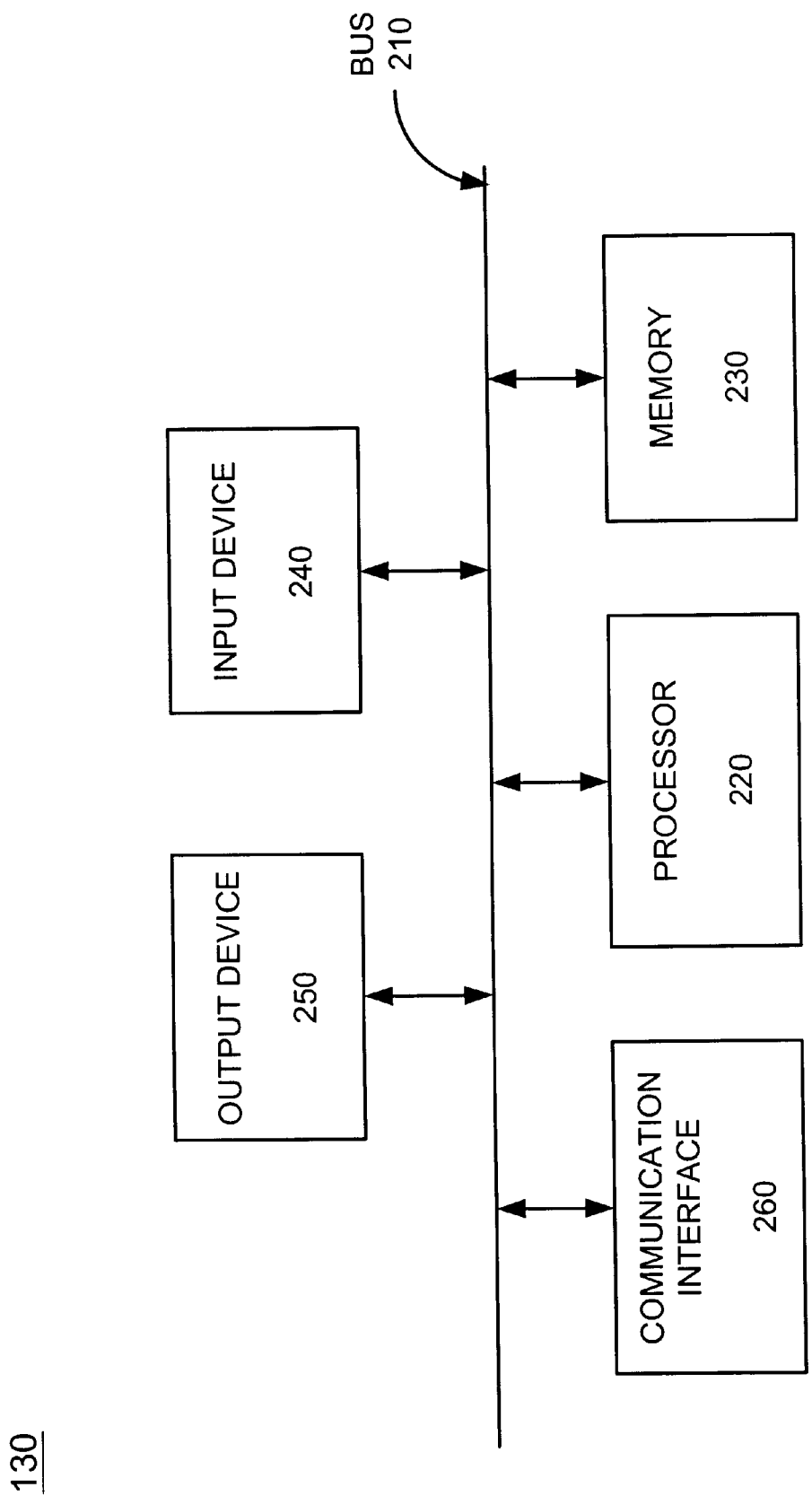
FIG. 2 is a diagram of an exemplary detection client of FIG. 1, consistent with an implementation of the present invention.

Detection client 130 may be any conventional processing device that includes a processor or microprocessor for executing instructions and a memory. FIG. 2 illustrates an exemplary detection client 130 consistent with the present invention. The detection client 130 includes a bus 210, a processor 220, a memory 230, an input device 240, an output device 250, and a communication interface 260. The bus 210 permits communication among the components of the detection client 130.

The processor 220 may include any type of conventional processor or microprocessor that interprets and executes instructions. The memory 230 may include a random access memory (RAM) or another type of dynamic storage device that stores information and instructions for execution by the processor 220; a read only memory (ROM) or another type of static storage device that stores static information and instructions for use by the processor 220; a flash memory that stores information and instructions for use by the processor 220; and/or some other type of magnetic or optical recording medium.

The input device 240 may include any conventional mechanism that permits a user to input information to the detection client 130, such as a button or similar device, a keyboard, a mouse, a pen, voice recognition and/or biometric mechanisms, etc. In an exemplary implementation, the input device 240 may be activated (e.g., by pressing a button) when a police car or radar trap is visually spotted.

The output device 250 may include any conventional mechanism that outputs information to the user, including a display, a printer, one or more speakers, etc. In an exemplary implementation consistent with the present invention, the output device 250 includes a display that provides a geographic map and other information regarding the vehicle's location. Radar sites and other related information may also be illustrated on the display. The output device 250 may also output audible tones and/or flash a light or LED to alert the driver of the vehicle to nearby radar traps or police vehicles. In implementations in which a vehicle may already include a display device, such as those used with conventional GPS devices often included in vehicles, the detection client 130 interfaces with the existing display device to display the information described above. In either case, the output device 250 or an existing display illustrates the vehicle's location and other geographically located symbols corresponding to radar traps, police vehicles and/or other police activity.

The communication interface 260 may include any transceiver-like mechanism that enables the detection client 130 to communicate with other devices and/or systems. For example, the communication interface 260 may include mechanisms for communicating via a wireless network, such as network 160 (FIG. 1). In this implementation, communication interface 260 may include a radio frequency (RF) transceiver that transmits information via network 160 and receives information from network 160.

The communication interface 260 may be a cellular telephone-like device, 6such as those commonly used in vehicles to communicate with operators/customer service when roadside assistance or other help is needed. In this implementation, the communication interface 260 may also function as the location detector 120. For example, the communication interface 260 may be used in a manner similar to a cellular telephone in an E-911 service to determine location information associated with the detection client 130.

In alternative implementations, communication interface 260 may be a two-way pager, a wireless Internet access device, such as a conventional high-speed wireless modem, or any other device that can communicate via a wireless network. In each case, the communication interface 260 communicates via wireless paths or links to geographically remote devices, such as detection server 180.

The detection client 130, consistent with the present invention, performs the functions necessary to transmit and receive radar location, police location and other information in response to processor 220 executing sequences of instructions contained in memory 230. Such instructions may be read into memory 230 from another computer-readable medium or from a separate device via communication interface 260. Execution of the sequences of instructions contained in memory 230 causes processor 220 to perform certain acts that will be described hereafter. In alternative embodiments, hard-wired circuitry may be used in place of or in combination with software instructions to implement the present invention. Thus, the present invention is not limited to any specific combination of hardware circuitry and software.

Referring back to FIG. 1, detection clients 140 and 150 may be configured in a manner similar to detection client 130. Detection clients 140 and 150 may be coupled to their own respective radar detectors and location detectors. Alternatively, detection clients 140 and 150 may be coupled to location detectors, but not radar detectors. In this implementation, detection clients 140 and 150 may receive radar and police vehicle location information, but may not transmit radar information.

Network 160 may include any conventional network, such as a wireless access network, that transfers data via RF links between devices. Network 170 may also include any conventional network, such as the Internet, a wide area network (WAN), a local area network (LAN), an intranet or another type of network. Networks 160 and 170 are illustrated as separate networks. It should be understood that networks 160 and 170 may be implemented as a single network in alternative implementations consistent with the present invention.

Detection server 180 may include one or more servers located at one or more locations. The detection server 180 receives information from and transmits information to detection clients 130, 140 and 150, via networks 160 and 170.

Figure 3:
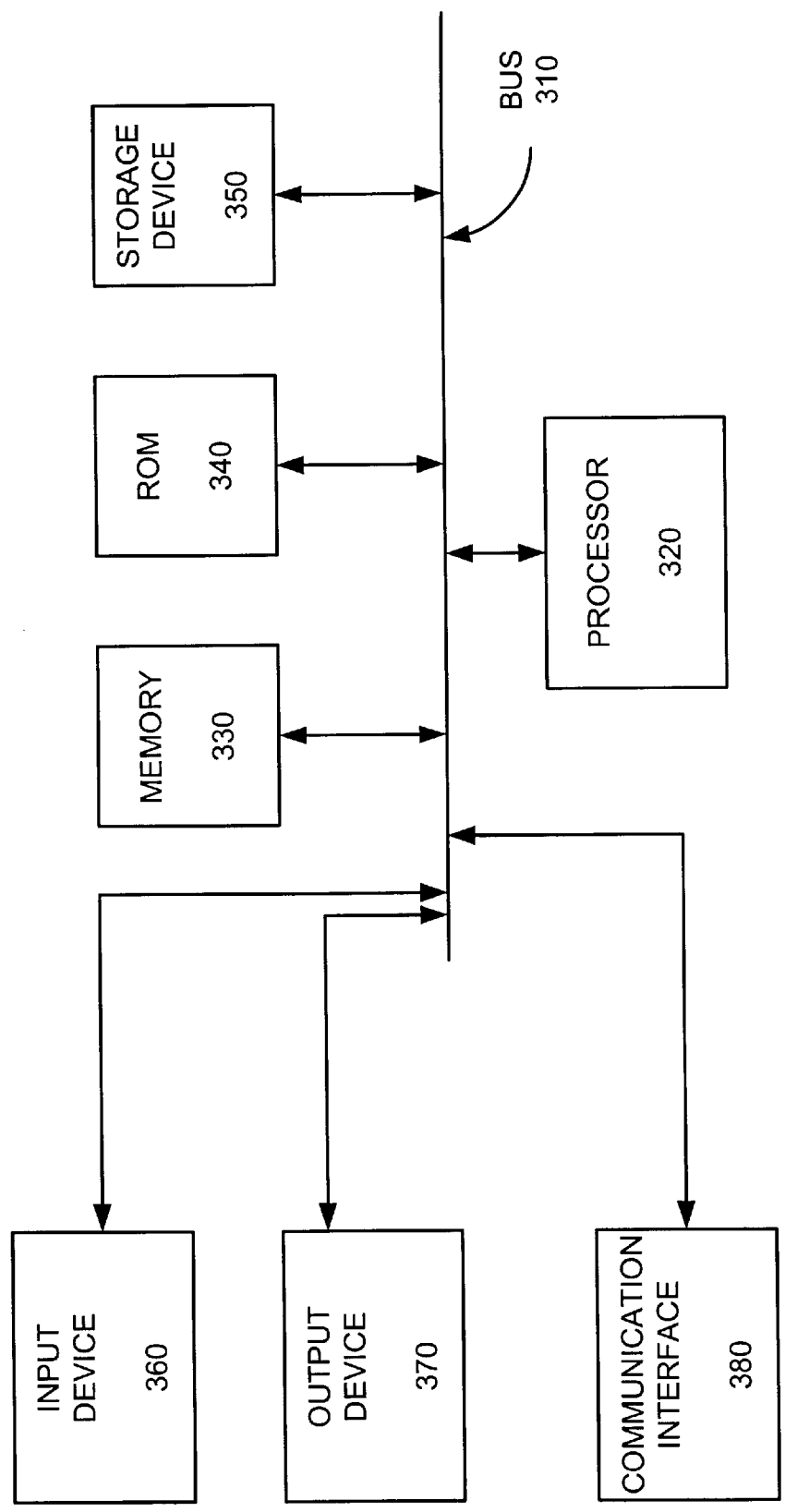
FIG. 3 is a diagram of an exemplary detection server of FIG. 1, consistent with an implementation of the present invention.

FIG. 3 illustrates an exemplary detection server 180, consistent with the present invention. Detection server 180 includes a bus 310, a processor 320, a memory 330, a ROM 340, a storage device 350, an input device 360, an output device 370, and a communication interface 380. The bus 310 permits communication among the components of the detection server 180.

The processor 320 may include any type of conventional processor or microprocessor that interprets and executes instructions. Memory 330 may be a RAM or another type of dynamic storage device that stores information and instructions for execution by processor 320. Memory 330 may also store temporary variables or other intermediate information used during execution of instructions by processor 320. The ROM 340 may include a conventional ROM device or another type of static storage device that stores static information and instructions for processor 320. The storage device 350 may include any type of magnetic or optical recording medium and its corresponding drive, such as a magnetic disk or optical disk and its corresponding disk drive.

The input device 360 may include any conventional mechanism that permits a user to input information to the detection server 180, such a keyboard, a mouse, a pen, voice recognition and/or biometric mechanisms, etc. The output device 370 may include any conventional mechanism that outputs information to the user, including a display, a printer, one or more speakers, etc. The communication interface 380 may include any transceiver-like mechanism that enables the detection server 180 to communicate via a network, such as network 170 or network 160. For example, communication interface 380 may include a modem or an Ethernet interface for communicating via a LAN. Alternatively, communication interface 380 may include other mechanisms for communicating with other devices and/or systems.

Detection server 180, consistent with the present invention, receives detection information from the detection clients 130–150 and distributes relevant information (i.e., nearby detection information) to the appropriate detection client(s). Detection server 180 performs such functions in response to processor 320 executing sequences of instructions contained in a computer readable medium, such as memory 330. A computer-readable medium may include one or more memory devices and/or carrier waves. Such instructions may be read into memory 330 from another computer-readable medium, such as storage device 350, or from a separate device via communication interface 380.

Execution of the sequences of instructions contained in memory 330 causes processor 320 to perform certain acts that will be described hereafter. In alternative embodiments, hard-wired circuitry may be used in place of or in combination with software instructions to implement the present invention. Thus, the present invention is not limited to any specific combination of hardware circuitry and software.

Exemplary Processing

Figure 4:
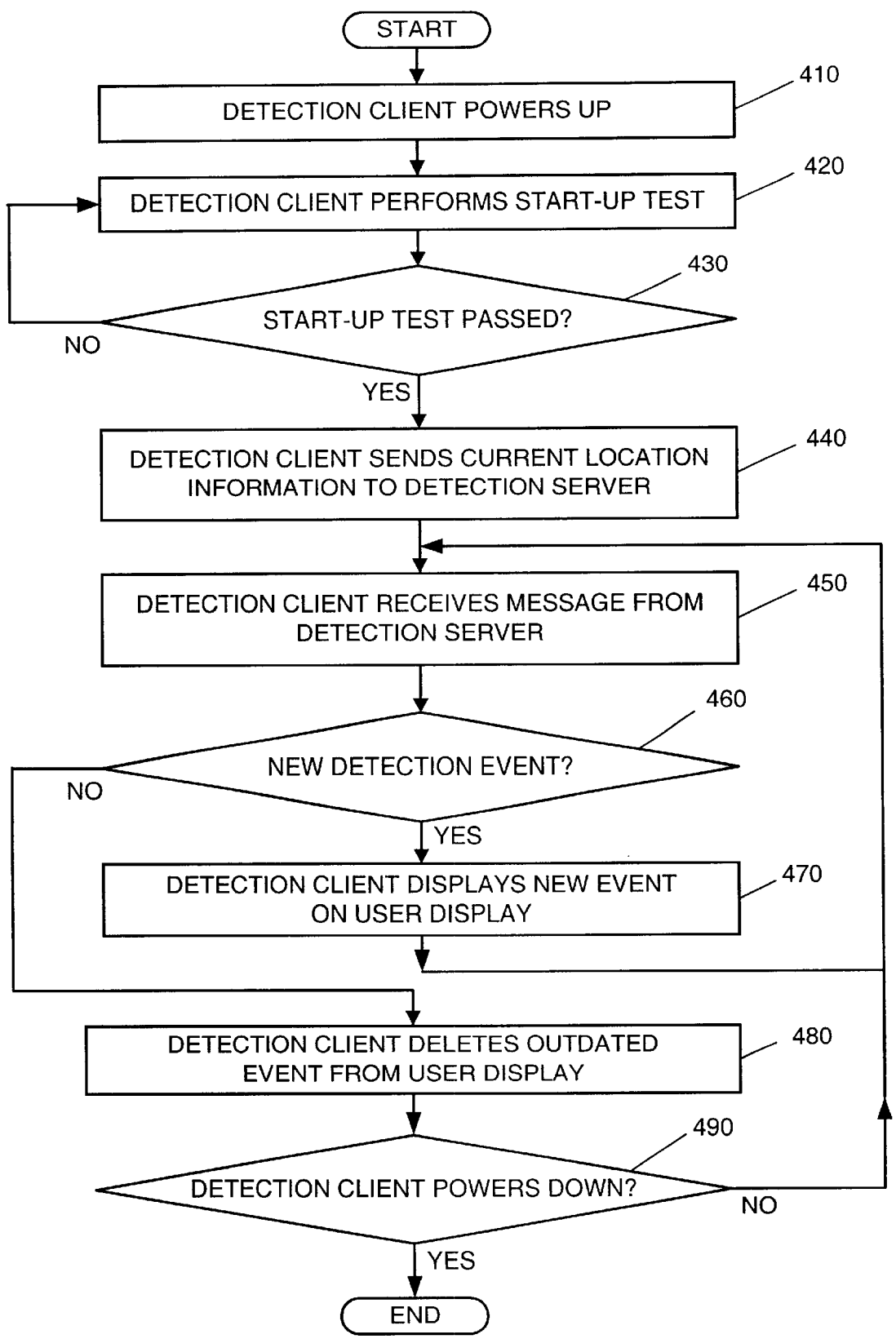
FIG. 4 is a flowchart of exemplary processing associated with displaying detection information, consistent with an implementation of the present invention.

FIG. 4 is a flowchart of exemplary processing associated with displaying detection information, consistent with an implementation of the present invention. Processing begins when a detection client, such as detection client 130 powers up (act 410). Detection client 130 may perform a start-up test to ensure that all of its components are working properly (act 420). Detection client 130 may also determine whether radar detector 110 and location detector 120 are present.

After completing its tests, detection client 130 determines whether the start-up test passed (act 430). For example, detection client 130 may determine that some problem exists, such as radar detector 110 is not present, location detector 120 is not working, communication interface 260 is unable to communicate with detection server 180, etc. If the start-up test fails, the detection client 130 waits a predetermined amount of time and retries the start-up tests. The detection client 130 may also display a message via output device 250 indicating that the test failed. The detection client 130 may continue to monitor its components and interfaces as it operates. When a failure is detected, detection client 130 displays an error message via its output device 250.

If the start-up test passes, the detection client 130 sends its current location to detection server 180 (act 440). As described previously, location detector 120 may be any conventional device, such as a GPS device, that is able to determine its location. Location detector 120 communicates the location information to detection client 130. Alternatively, detection client 130 polls location detector 120, when necessary, to obtain the location information. In either case, detection client 130 may then transmit the location information to detection server 180, via networks 160 and 170. The detection client 130 may periodically (e.g., every 15 seconds) transmit location information received from location detector 120 to detection server 180. This provides detection server 180 with current location information regarding detection client 130. Detection server 180 may send an acknowledgement message to detection client 130 indicating that the location information was received without errors.

As described previously, in an alternative implementation, location detector 120 and/or communication interface 260 of detection client 130 may include a cellular telephone-like device. In this implementation, detection server 180 may determine the location of detection client 130 in a manner similar to that in an E-911 service. In this case, act 440 may not be required since detection server 180 determines the location of detection client 130.

In any event, assume that detection client 130 receives a message from detection server 180 (act 450). Detection server 180 may transmit messages to detection clients, such as detection client 130, based on the locations of the particular detection clients. The messages may indicate that a new detection has been received in an area that is relevant to detection client 130. For example, the message may indicate that police or radar activity has been reported within a predetermined range of the location associated with detection client 130. Alternatively, the message may indicate that a previous detection is no longer relevant to detection client 130.

Detection client 130 determines if the message is associated with a new detection event (act 460). If the message is associated with a new detection, the message includes the type of detection and the geographic location of the detection. Detection client 130 may then display information relating to the new detection via output device 250 (act 470).

For example, detection client 130 may display a particular symbol that indicates a radar trap or police activity at a particular location. Acts 480 and 490 are discussed herein below after a discussion of FIG. 5.

Figure 5:
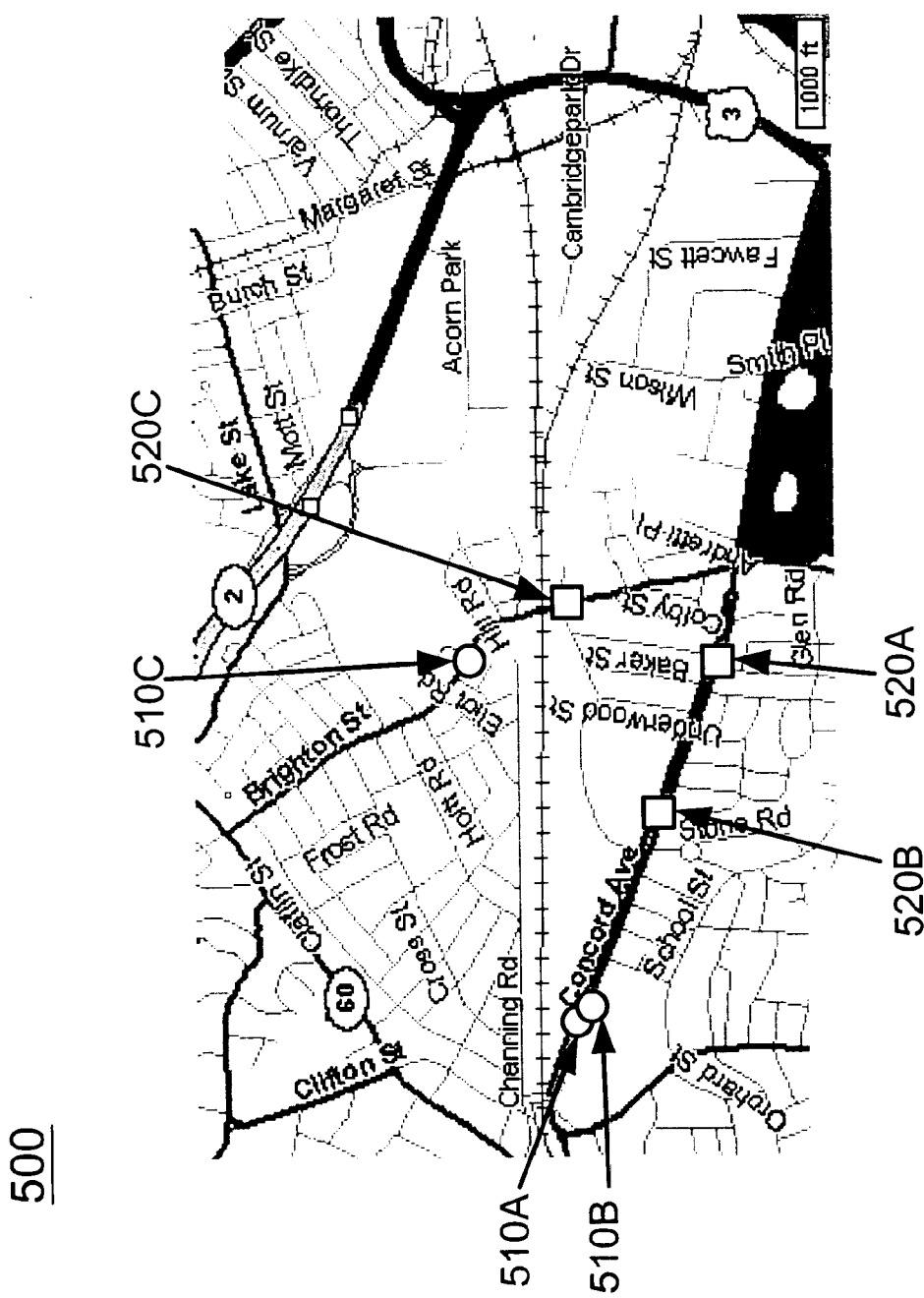
FIG. 5 illustrates an exemplary display consistent with an implementation of the present invention.

FIG. 5 illustrates an exemplary display 500 consistent with an implementation of the present invention. The display 500 includes circle symbols and square symbols, in addition to the normal map symbology. The circles, labeled 510A, 510B and 510C may illustrate visual sightings of police cars. The squares, labeled 520A, 520B and 520C, may illustrate detected radar activity. The location of the vehicle associated with the displayed map may be, for example, in the middle of the display 500. Alternatively, a third symbol, such as a star or an arrow, may be used to illustrate the vehicle's location. In either case, by quickly viewing the display 500, the driver can see where radar activity and police cars have been detected.

The detection client 130 may also generate an audible alarm when the new detection information is displayed. The audible alarm may get louder or chime as the vehicle gets closer to the location associated with the detection event. The audible alarm may also include a voice providing information regarding an impending speed trap, such as "Approaching speed trap on Concord Avenue in one mile," or "Police car sighted within one-tenth of a mile." Alternatively, a prominent visible alarm, such as a flashing symbol, may be displayed as the vehicle gets closer to the location associated with the detection event. Alternatively, any combination of audible and visible alarms may be used to alert the driver of radar or other police activity.

Referring back to FIG. 4, if the message is not associated with a new detection event, assume that the message indicates that a previous detection event is no longer relevant. For example, a previous detection event may be associated with a reporting that occurred more than a predetermined amount of time earlier, such as one hour earlier. In this situation, the detection event may be considered "stale" or "aged" and detection client 130 deletes the stale or aged detection event (act 480).

For example, if the message indicates that the detection illustrated as radar detection 520A on display 500 is stale, detection client 130 deletes symbol 520A from display 500. Alternatively, if the stale detection event is not being actively displayed, but is stored in memory 230, detection client 130 may erase this stale detection event from memory 230. It should be understood that the particular amount of time after which a detection event is considered "stale" may be any value and may be programmable by the individual user. For example, the user may set a predetermined time, via input device 240 (FIG. 2), in which detection client 130 will consider detection events to be stale. In this manner, one particular user (e.g., detection client 130) may decide that any event more than 60 minutes old is stale and should be deleted from the user display 500 or from memory 230, while another user (e.g., detection client 140) may decide that any event more than 10 minutes old is stale.

Processing may return to act 450 and continue as described above until the user powers down the detection client (act 490). As described above, the detection server 180 transmits messages to detection clients, such as detection client 130. The detection client 130 processes the message and performs the appropriate procedure based on the contents of the message. The messages may relate to radar traps, police sightings or other information detected by other detection clients, such as detection clients 140 and 150.

Processing associated with transmitting detection information to detection server 180 is described in more detail below.

Figure 6:
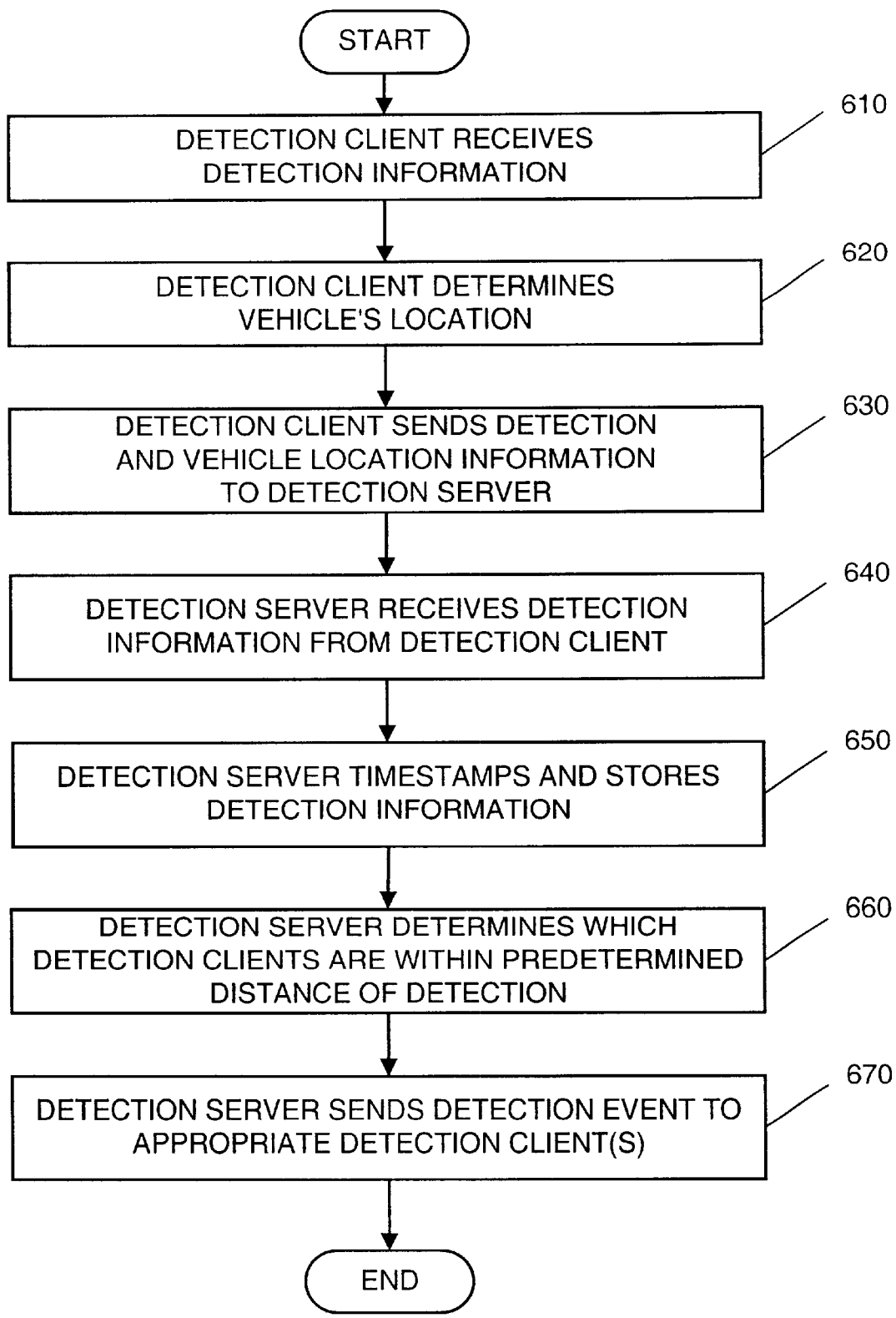
FIG. 6 is a flowchart of exemplary processing associated with detecting and transmitting detection information, consistent with an implementation of the present invention.

FIG. 6 is a flowchart of exemplary processing associated with detecting and transmitting information to detection server 180. Assume that detection client 130 has powered up and passed its start-up test. Further assume that detection client 130 receives detection information (act 610). The detection information may be received when radar detector 110 detects radar activity. In this case, the radar detector 110 performs its normal processing to alert the driver (i.e., outputs an audible alarm and/or flashes its LEDs). Radar detector 110 also transmits a signal to detection client 130 indicating that radar activity has been detected. Alternatively, the driver of the vehicle or a passenger in the vehicle may activate input device 240 (FIG. 2) to indicate that police activity has been visually detected. In this case, the party may press a button on detection client 130 indicating that a police car has been sighted.

After the detection information has been received, the detection client 130 may determine the current location of the vehicle using location detector 120 (act 620). Detection client 130 may also determine the type of detection. For example, in an exemplary implementation consistent with the present invention, the detection client 130 determines whether the detection information is associated with a radar detection or a visual police detection. The detection client 130 then transmits the vehicle's current location and the type of detection to detection server 180, via networks 160 and 170 (act 630). The detection client 130 may also display the detection via its user display 500.

The detection server 180 receives the detection information from detection client 130 (act 640). The detection server 180 timestamps the detection information with the current time. Alternatively, the detection information received by detection server 180 may be timestamped by detection client 130 with the time when the detection occurred. In either case, the detection server 180 stores the detection information and timestamp information into memory (act 650). Acts 660 and 670 are discussed herein below after a discussion of FIG. 7.

FIG. 7 illustrates an exemplary database 700 consistent with an implementation of the present invention. Database 700 may be stored, for example, in storage device 350 or memory 330. Referring to FIG. 7, the database 700 includes a detection client field 710, a client location field 720, a detection type field 730, a detection location field 740 and a timestamp field 750. Other fields may be included in database 700 based on the user's particular requirements. The detection client field 710 may include a unique identifier associated with each respective detection client. For example, each of detection clients 130, 140 and 150 may have a unique identifier. Client location field 720 may include the current location associated with the corresponding detection client in detection client field 710. As described previously, each detection client may transmit its location information to detection server 180 at predetermined intervals.

Detection type field 730 may include information that identifies whether a received detection was a radar detection, a visual detection or another type of detection. For example, in some implementations of the present invention, a light beam detector may be included in a vehicle. The light beam detector may be used to detect police use of light beams that determine a vehicle's speed, as opposed to more typical radar waves. In this implementation, the detection type field 730 may indicate whether the detection was a light beam detection.

Detection location field 740 may include the location information received with the detection information. In an exemplary implementation, location field 740 may store geographical coordinates (e.g., latitude and longitude) associated with where the detection occurred. Timestamp field 750 stores the time associated with when the detection information was timestamped by detection server 180. Alternatively, when the received detection information includes timestamp information, timestamp field 750 includes the received timestamp.

Returning to FIG. 6, detection server 180 accesses database 700 and identifies all detection clients located within a predetermined distance of a detection stored in database 700 (act 660). For example, detection server 180 may identify detection clients located within 1.0 mile, 0.5 miles, or any other distance from a detection stored in detection location field 740, based on information in client location field 720. If no detection clients are currently within the predetermined distance of a detection, such as the detection received at act 640, the detection server 180 may not transmit any detection events to other detection client at this time. The detection server 180, however, may transmit a message to detection client 130 (i.e., the detection client 130 that reported the detection event) that acknowledges the receipt of the detection message If, however, one or more detection clients are currently located within the predetermined distance of a detection event, the detection server 180 sends a detection message to the appropriate detection client(s) (act 670). The message may include the type of detection and the geographic location of the detection. The message may also include time information relating to when the detection was reported.

Detection client 130 receives the new detection message and may then display the detection event, as described above with regard to FIG. 4. In this manner, detection server 180 informs detection clients of relevant radar, police and other activity that were detected by other detection clients.

As described above, detection server 180 receives detection information from detection clients, such as detection client 130, and transmits the detection information to the appropriate other detection clients, based on the location of the respective detection clients and the location of the detection. Processing associated with tracking the detection clients and managing the received detection information is described in more detail below.

Figure 8:
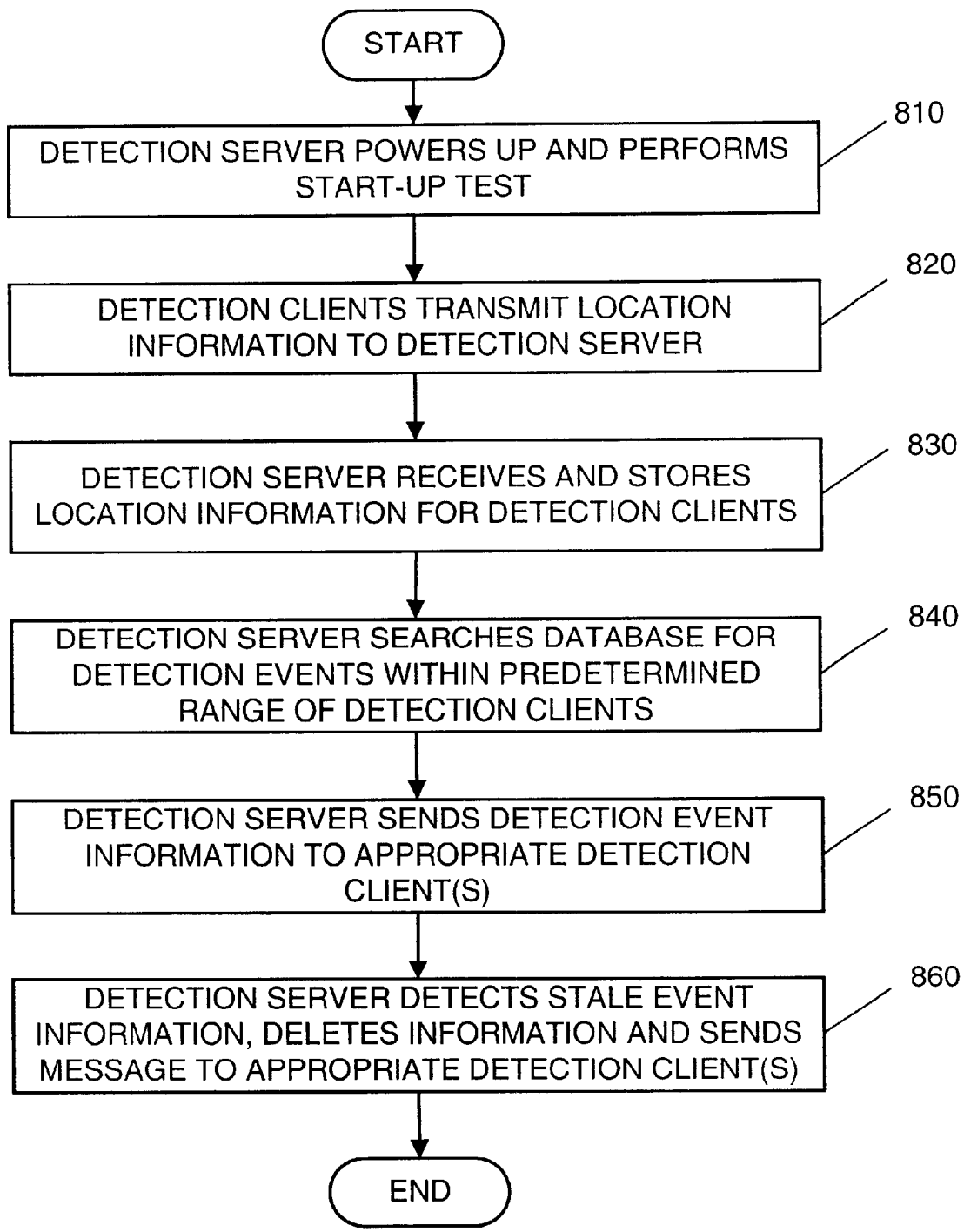
FIG. 8 is a flowchart of exemplary processing associated with managing detection information, consistent with an implementation of the present invention.

FIG. 8 is a flowchart of exemplary processing associated with managing detection information. As described previously, network 100 may include a number of detection servers located in one location or spread throughout a region or the country. For simplicity, the description below assumes that a single detection server 180 is employed in network 100. Processing may begin when detection server 180 powers up. Detection server 180 may perform a start-up test to ensure that all of its components are working properly (act 810). For example, detection server 180 may check whether communication interface 380 is able to communicate with detection clients 130–150.

Assuming that the start-up test indicates that detection server 180 is functioning properly, detection clients 130, 140 and 150 periodically transmit new location information to detection server 180 (act 820). Detection server 180 receives this location information and stores it in database 700 (act 830). More particularly, detection server 180 may store the location information associated with detection clients 130–150 in the client location field 720 associated with the respective detection clients 130–150.

Detection server 180 may then search database 700 for all detection events located within a predetermined range (e.g., within 0.5 miles, 1.0 mile, etc.) of any of the detection clients 130–150 (act 840). As a vehicle associated with a detection client moves and the detection client transmits its new location information, the client location field 720 associated with that detection client changes. Therefore, in an exemplary implementation of the present invention, the detection server 180 continuously searches for detection events that are within the predetermined distance of each of the respective detection clients.

Assume that one or more detection events are located within the predetermined range of detection client 130. In this case, the detection server 180 may send the complete list of detection events that are within the predetermined range to detection client 130 (act 850). Alternatively, detection server 180 may send only the changes from whenever it last sent one or more detection events to detection client 130 (e.g., new detection events recently received or detection events that are now within the predetermined range of detection client 130). In this implementation, if no detection events are relevant to a particular detection client, detection server 180 may transmit an Acknowledgement message indicating that the new location information associated with that detection client was received without any problems, such as transmission or reception errors. The detection server 180, however, may not send any detection events to that detection client.

Detection server 180, as described previously, stores each detection that it receives from the detection clients. The detection server 180, consistent with the present invention, may also determine whether any of the stored detections are stale. For example, detection server 180 examines the timestamp field 750 of each detection stored in database 700 to determine if the event has been stored for a predetermined period of time. The particular period of time may be programmable to any particular value.

When a stale event is detected, detection server 180 deletes the event information from database 700 (act 860). Detection server 180 may also send a message to each of the detection clients within a predetermined distance of the stale detection indicating that the corresponding detection should be deleted (act 860). Alternatively, the detection server 180 may transmit the message regarding the stale detection to all of the detection clients. In either case, the detection clients receive the message, identify the particular detection event and remove the associated detection from the display and/or remove the stored detection information from its corresponding memory, such as memory 230.

Systems and methods consistent with the present invention link detection clients to enable radar detections, police sightings and other information to be shared over a network. An advantage of the present invention is that drivers may be alerted to speed traps, thereby enabling the driver to safely slow down before entering the trap. In addition, although the present invention has been described in relation to detecting speed traps, another advantage of the present invention is that drivers may be able to quickly locate nearby police vehicles in an emergency situation.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while radar detectors, visual input devices and light beam detectors have been described as exemplary devices that may be used with the detection clients, other types of detectors may also be employed. For example, audio detectors or microphones may be used to distinguish police sirens. This information may then also be transmitted to the detection server 180 and displayed by the appropriate detection clients. In addition, the present invention has been described as including a radar detector, a location detector and a detection client as separate devices. In alternative implementations, these devices may all be components of the detection client.

The present invention has also been described as communicating information between detection clients and detection server using conventional protocols, e.g., a TCP/IP protocol. Alternatively, any protocol may be used, including specialized protocols for two-way pagers.

Further, the present invention has been described as transmitting relevant detection information to detection clients that are located within a predetermined distance of a received detection. The predetermined distance, as described above, may be user-selectable. The predetermined distance may also be predetermined based on the particular area. For example, the predetermined distance may be large in Nebraska and small in Manhattan.

Lastly, a number of variables used in the present invention have been described as programmable or user-configurable. Other variables may also be user-configurable. For example, the particular symbology used may also be selectable by the user. The user may, for example, select the particular symbols via a set-up screen. The audible alarms may also be configurable (e.g., sound, volume, whether sampled sounds of police sirens should be played, the language in which a warning is given). Special indications may also be given in areas in which GPS does not work well, such as Manhattan or other dense urban areas. The amount of time that a given detection is shown on a user's screen may also be configurable by the user. Other variables may also be programmable or user-configurable in implementations of the present invention.

The scope of the invention is defined by the claims and their equivalents.

What is claimed is:

1. A method comprising:
    receiving location information associated with each of a plurality of client devices;
    storing the location information;
    receiving detection information from at least a first one of the plurality of client devices, the detection information relating to at least one of radar activity, light beam activity and a police sighting;
    identifying a detection type associated with the detection information, wherein the detection type comprises at least one of radar activity, light beam activity and a police sighting;
    identifying a location associated with the detection information;
    storing the detection information;
    transmitting the detection information to at least a second one of the client devices;
    receiving, by the second client device, the detection information; and
    displaying, by the second client device, a map that includes first symbols representing radar activity or light beam activity and second symbols representing police sightings.

2. The method of claim 1, further comprising:
    identifying the second client device based on the stored location information associated with the second client device and the location associated with the detection information.

3. The method of claim 1, further comprising:
    outputting an audible alert indicating that at least one of radar activity, light beam activity and a police sighting have been detected in a vicinity of the second client device.

4. The method of claim 1, further comprising:
    timestamping the detection information;
    storing the timestamp;
    determining whether the detection information is aged based on the timestamp; and
    transmitting a message to at least one of the plurality of client devices when the stored detection information is aged, the message indicating that the detection information is no longer valid.

5. The method of claim 4, further comprising:
    receiving the message by the at least one client device; and
    deleting information stored in the at least one client device based on the received message.

6. A system, comprising:
    a memory; and
    a processor coupled to the memory, the processor configured to:
        receive location information associated with each of a plurality of client devices, store the location information in the memory,
        receive detection information from at least a first one of the plurality of client devices, the detection information relating to at least one of radar activity, a police sighting and light beam activity,
        identify a detection type associated with the detection information, wherein the detection type comprises at least one of radar activity, a police sighting and light beam activity,
        identify a location associated with the detection information,
        store the detection information, the detection type and the location associated with the detection information in the memory, and
        transmit the detection information, the detection type and the location associated with the detection information to at least a second one of the client devices.

7. The system of claim 6, the processor being further configured to:
    compare the location information in the memory with the location associated with the detection information, and
    identify the second client device based on the comparison.

8. The system of claim 7, wherein when identifying the second client device, the processor is configured to:
    determine whether the second client device is located within a predetermined distance of the location associated with the received detection information.

9. The system of claim 6, the processor being further configured to:
    timestamp the detection information,
    store the timestamp,
    determine whether the detection information is aged based on the timestamp, and
    transmit a message to at least one of the plurality of client devices when the stored detection information is aged, the message indicating that the detection information is no longer valid.

10. A computer-readable medium having stored thereon a plurality of sequences of instructions which, when executed by a processor, cause said processor to:

obtain location information associated with each of a plurality of client devices;

receive detection information from at least a first one of the plurality of client devices, the detection information relating to at least one of radar activity, a police sighting and light beam activity;

identify a detection type associated with the detection information, wherein the detection type comprises at least one of radar activity, a police sighting and light beam activity;

identify a location associated with the detection information; and transmit the detection information, the detection type and the location associated with the detection information to at least a second one of the client devices.

11. The computer-readable medium of claim 10, including instructions for causing the processor to:

compare the location information with the location associated with the detection information; and identify the second client device based on the comparison.

12. The computer-readable medium of claim 11, wherein when identifying the second client device, the processor:

determines whether the second client device is located within a predetermined distance of the location associated with the received detection information.

13. The computer-readable medium of claim including instructions for causing the processor to:

timestamp the detection information;

store the detection information and the timestamp;

determine whether the detection information is aged based on the timestamp; and transmit a message to at least one of the plurality of client devices when the detection information is aged, the message indicating that the detection information is no longer valid.

14. A system for use in a first vehicle, comprising:

a memory;

a processor coupled to the memory, the processor configured to:

receive first detection information from a server via a network, the first detection information including a detection type and location information associated with the first detection information, the detection type representing at least one of radar activity, light beam activity and a police sighting detected by a second vehicle, store the first detection information in the memory, and transmit a signal indicating that at least one of radar activity, light beam activity and a police sighting has been detected; and a display device configured to:

display a map including first symbols representing a first detection type and second symbols representing a second detection type.

15. The system of claim 14, wherein the display device is further configured to:

receive the signal, and display a visible indication on the map based on the signal.

16. The system of claim 15, wherein the display device is further configured to output an audible indication based on the signal.

17. The system of claim 15, wherein the first symbols represent at least one of radar activity and light beam activity and the second symbols represent police sightings.

18. The system of claim 14, wherein the processor is further configured to:

receive second detection information from at least one of a radar detector and a light beam detector, and transmit the second detection information to the server via the network, the second detection information including location information and an associated detection type.

19. The system of claim 14, wherein the processor is further configured to:

receive second detection information from an input device, the second detection information being associated with a police sighting, and transmit the second detection information to the server via the network, the second detection information including location information and an associated detection type.

20. The system of claim 14, the processor being further configured to:

receive location information from a location detection device, and periodically transmit the location information to the server.

21. The system of claim 14, the processor being further configured to:

timestamp the first detection information, and delete the stored first detection information after a predetermined amount of time.

22. A computer-readable medium having stored thereon a plurality of sequences of instructions which, when executed by a processor, cause said processor to:

receive first detection information from a server via a network, the first detection information including location information and a detection type identifying at least one of radar activity, light beam activity and a police sighting;

store the first detection information in a memory; and display a map including first symbols representing at least a first detection type and second symbols representing at least a second detection type.

23. The computer-readable medium of claim 22, wherein the first detection type comprises at least one of radar activity and light beam activity and the second detection type comprises a police sighting.

24. The computer-readable medium of claim 22, including instructions for causing the processor to:

receive second detection information from at least one of a radar detector and a light beam detector; and transmit the second detection information to the server via the network, the second detection information including location information and an associated detection type.

25. The computer-readable medium of claim 22, including instructions for causing the processor to:

receive second detection information from an input device, the second detection information being associated with a police sighting; and transmit the second detection information to the server via the network, the second detection information including location information and an-associated detection type.

26. The computer-readable medium of claim 22, including instructions for causing the processor to:

receive location information from a location detection device; and transmit the location information to the server every predetermined period of time.

27. The computer-readable medium of claim 22, including instructions for causing the processor to:

timestamp the first detection information; and delete the stored first detection information after a predetermined amount of time.

28. A system for sharing information among a plurality of detection clients using at least one server, comprising:

means for receiving, by the server, detection information from the plurality of detection clients, the detection information including a detection type identifying at least one of radar activity, light beam activity and police sighting information;

means for storing the detection information to obtain stored detection information;

means for determining whether the stored detection information is relevant to at least one of the plurality of detection clients; and means, responsive to operation of said determining means determining that the stored detection information is relevant to at least one of the plurality of detection clients, for transmitting the detection information to the at least one relevant detection client, the transmitted detection information including the detection type and location information.

29. A system, comprising:

a location detector configured to determine its geographical location;

a radar detector configured to detect radar waves and output a signal when the radar waves are detected;

a processing device configured to:

receive the signal from the radar detector, transmit a first message indicating that the radar waves have been detected, along with geographical information associated with the detected radar waves, for use by others via a network, and receive a second message via the network, the second message comprising detection information including a detection type identifying at least one of a radar detection, a light beam detection and a police sighting and location information associated with the detection information; and a display device configured to display a map including at least one of first symbols representing a radar or light beam detection and second symbols representing police sightings.

* * * * *